United States Patent
Deshpande (10) Patent No.: US 8,346,959 B2
(45) Date of Patent: Jan. 1, 2013

(54) CLIENT-CONTROLLED ADAPTIVE STREAMING

(75) Inventor: Sachin G. Deshpande, Vancouver, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 689 days.

(21) Appl. No.: 11/863,557

(22) Filed: Sep. 28, 2007

(65) Prior Publication Data

US 2009/0089445 A1 Apr. 2, 2009

(51) Int. Cl.
*G06F 15/16* (2006.01)

(52) U.S. Cl. ......... 709/233; 709/231; 709/228; 709/232

(58) Field of Classification Search .................. 709/223, 709/231, 228, 232
See application file for complete search history.

(56) References Cited

U.S. PATENT DOCUMENTS

| | | | |
|---|---|---|---|
| 6,434,319 B1 * | 8/2002 | Wine | 386/46 |
| 2002/0064273 A1 * | 5/2002 | Tomikawa et al. | 379/221.02 |
| 2004/0044783 A1 * | 3/2004 | Nordberg | 709/231 |
| 2004/0139088 A1 | 7/2004 | Mandato et al. | |
| 2004/0193762 A1 * | 9/2004 | Leon et al. | 710/52 |
| 2004/0196849 A1 | 10/2004 | Aksu et al. | |
| 2004/0243629 A1 | 12/2004 | Nomura et al. | |
| 2005/0275752 A1 | 12/2005 | Li et al. | |
| 2006/0005101 A1 | 1/2006 | Li et al. | |
| 2006/0109856 A1 * | 5/2006 | Deshpande | 370/412 |
| 2007/0043875 A1 * | 2/2007 | Brannon, Jr. | 709/231 |

FOREIGN PATENT DOCUMENTS

| | | |
|---|---|---|
| EP | 1 554 812 B1 | 7/2005 |
| JP | 2004-266615 | 9/2004 |
| WO | WO 02/078289 A1 | 10/2002 |
| WO | WO 2004/012088 A1 | 2/2004 |
| WO | WO 2004/036760 A1 | 4/2004 |
| WO | WO 2004/036916 A1 | 4/2004 |
| WO | WO 2004/040777 A1 | 5/2004 |
| WO | WO 2004/072765 A1 | 8/2004 |
| WO | WO 2004/072766 A2 | 8/2004 |
| WO | WO 2006/058203 A2 | 6/2006 |

OTHER PUBLICATIONS

Schulzrinne, H., Casner, S., Frederick, R., & Jacobson, V., "RTP: A Transport Protocol for Real-Time Applications," Jul. 2003, Internet<URL:http://www.ietf.org/rfc/rfc3550.txt>.

Schulzrinne, H. & Lanphier, R., "Real Time Streaming Protocol (RTSP)," Apr. 1998, Retrieved from Internet<URL:http://www.ietf.org/rfc/rfc2326.txt>.

* cited by examiner

*Primary Examiner* — Jude Jean Gilles
*Assistant Examiner* — Jaren M Means
(74) *Attorney, Agent, or Firm* — Michael Blaine Brooks, PC; Pejman Yedidsion; David Ripma (57) ABSTRACT

A client determines the transmission of a data stream from a server and transmits to the server a Real-Time Streaming Protocol (RTSP) header having either RTSP Speed or both RTSP Scale and RTSP Speed values where the values are formed based at least on the determined transmission rate of the data stream received by the client and a reference data stream rate. An RTSP server responsive to the Speed value or the Speed and Scale value may adjust properties of the data stream being transmitted in response to the RTSP header values sent by the client.

16 Claims, 9 Drawing Sheets

CLIENT-CONTROLLED ADAPTIVE STREAMING

FIELD OF ENDEAVOR

The field of endeavor in which the invention, in its several embodiments, pertains generally is the multi-computer data transferring in systems having electrical computers and digital processing systems and more particularly pertains to computer-to-computer, television-to-television, and television-to-computer data transfer regulating via client-controlled adaptive streaming.

BACKGROUND

In a networked audiovisual transmission system, multimedia data packets being transmitted from a sender device, e.g., a server, to a receiving device, e.g., a client, can experience network congestion or other network impairments. As a result of the network congestion or impairments, the client or sender may employ rate adaptation or other forms of adaptive streaming. Existing methods have the sender actively involved in decision-making about such rate adaptation. For example, a Real-Time Streaming Protocol (RTSP) server may change the rate at which media is presented to the user, at the client in a client-server model, via the RTSP Scale header. If a value of Scale of 1.0 in the RTSP Scale header represents viewing the stream at normal viewing rate, then a scale value of one-half provides viewing the stream in slow motion, and a scale value of five provides for viewing the stream in a fast forward manner. Also for example, an RTSP server may change the media delivery rate from the server to the client via the RTSP Speed header. If a speed value of one, i.e., Speed=1, in the RTSP Speed header represents a one-for-one relationship between reception duration and playback duration (or more particularly, media delivery rate and media playback rate), then a speed value of two, i.e., Speed=2, has each second of client-received media requiring two seconds for playback for the user. In order to maintain media traffic within the bandwidth allotted, the server may also employ bit-rate adaptation.

An example of bit-rate adaptation on the server side is bit-stream switching where the server draws from a first stored media having one quality and then, when nearing allotted bandwidth saturation, switches to a second stored media having a second quality, where the second quality is lower than the first quality and accordingly requires less bit-rate. A server may also function to maintain the client's buffer in a healthy state via forms of buffer management. This type of buffer management is typically directed to the avoidance of buffer overflow or underflow. This type of buffer management is also typically directed to maintaining media play time present in a buffer in sufficient amounts to safeguard against temporary or longer term changes of bit-rate capacity available to the client-server in the streaming session. The buffered media play time in turn allows the server time to react to such changes before a buffer is exhausted. For example, $3^{rd}$ Generation Partnership Project (3GPP) Packet-based Streaming Service provides the server with additional feedback and configuration information as to the buffer status. Accordingly, a server having such feedback may change media transmission rate as needed in concert with bit-rate adaptation, e.g., to lower the quality while increasing the speed to refill a nearly empty buffer.

SUMMARY

Computer-implemented method, apparatus and system embodiments of the invention described herein provide for the adjustment of data transmission rates and properties of streaming data from a server to the client as requested by the receiving client. In some computer-implemented method embodiments of adapting a data stream, the steps include: (a) determining, by a client, a transmission rate of a received data stream; (b) forming a speed value, e.g., an RTSP Speed value, as a function of the determined transmission rate of the received data stream and a reference data stream rate; and (c) transmitting the formed speed value to a server. The exemplary method may further include inserting the formed speed value into an RTSP header wherein the formed speed value is transmitted to the server within the RTSP header. In some method embodiments, the speed value formation may include the incorporation of a minimum slowdown factor. Another exemplary method embodiment may include forming a scale value, e.g., an RTSP Scale value, as a function of the determined transmission rate of the received data stream and a reference data stream rate and transmitting the formed scale value to the server and this exemplary embodiment may further include a step of inserting the formed scale value into a RTSP header wherein the formed scale value is transmitted to the server within the RTSP header along with the RTSP Scale value. Another exemplary embodiment may include forming the scale value as a function of the determined transmission rate of the received data stream, the reference data stream rate, and optionally a member of a set of server-supported scale values. Another exemplary embodiment may include forming the speed value as an inverse function of the formed scale value, and the forming of the scale value may optionally be based on a member of a set of server-supported scale values.

The invention may be embodied by an apparatus such as a computer comprising a processor that executes machine instructions and memory, or a television with processor and memory, and having (a) means for determining a transmission rate of a received data stream via, for example, an additional or the same processor executing machine readable instructions, computing circuitry or, a combination of both; (b) means for forming a speed value as a function of the determined transmission rate of the received data stream and a reference data stream rate via, for example, an additional or the same processor executing machine readable instructions, computing circuitry, or a combination of both; and (c) means for transmitting the formed speed value via, for an example, an output port for a wired or wireless network link or an integral wireless transmitter. In addition, the exemplary computer embodiment may also include, along with the means for transmitting the formed speed value, means for transmitting the formed speed value to a server originating the received data stream also via, for an example, the output port for a wired or via a wireless network link or an integral wireless transmitter wherein the transmission conforms to one or more routing protocols. The means for transmitting the formed speed value may include means for transmitting the formed speed value within an RTSP header such as via the same, or an additional, processor executing machine readable instructions, computing circuitry, or a combination of both. In some embodiments, the computer may include means for forming the speed value as a function of a minimum slowdown factor and optionally the means for transmitting the formed speed value may include means for transmitting the formed speed value to a server originating the received data stream via, for an example, an output port for a wired or wireless network link or an integral wireless transmitter wherein the transmission conforms to one or more routing protocol. Exemplary computer embodiments may also include means for forming a scale value as a function of the determined transmission rate of the received data stream and a reference data stream rate such as via an additional or the same processor executing machine readable instructions, computing circuitry, or a combination or both and means for transmitting the formed scale value to the server originating the received data stream, via, for an example, an output port for a wired or wireless network link or an integral wireless transmitter, wherein the transmission conforms to one or more routing protocol. Other exemplary computer embodiments may include means for forming a scale value as a function of the determined transmission rate of the received data stream, a reference data stream rate, and a member of a set of server-supported scale values such as via an additional or the same processor executing machine readable instructions, computing circuitry, or a combination or both. Additional exemplary computer embodiments may include means for forming a speed value as an inverse function of the formed scale value and, additionally, including the option of forming the speed value as an inverse function of the formed scale value where the scale value may also be a member of a set of server-supported scale values and such forming means may be via an additional or the same processor executing machine readable instructions, computing circuitry, or a combination of both.

The invention may be embodied by an exemplary system that includes a client node and a server node wherein the client node comprises: (a) a processor and a memory store; (b) means for determining a transmission rate of a received data stream via, for example, an additional or the same processor executing machine readable instructions, computing circuitry, or a combination of both; (c) means for forming a speed value as a function of the determined transmission rate of the received data stream and a reference data stream rate via, for example, an additional or the same processor executing machine readable instruction, computing circuitry, or a combination of both; and (d) means for transmitting the formed speed value via, for an example, an output port for a wired or wireless network link or an integral wireless transmitter; and wherein the server node comprises a processor and a memory store and means for receiving the transmitted formed speed value via, for an example, an input port for a wired or wireless network link or an integral wireless receiver. The server node may further include means for adapting or adjusting the transmission rate or other properties of the data stream received by the client node such as via an additional or the same server processor executing machine readable instructions, server-side computing circuitry, or a combination of both. The client node may include means for transmitting the formed speed value that may include includes means for transmitting the formed speed value within an RTSP header via, for an example, an output port for a wired or wireless network link or an integral wireless transmitter. The means for forming the speed value by the client node may include means for forming the speed value so that the formed speed value is a function of a minimum slowdown factor via an additional or the same client processor executing machine readable instructions, client-side computing circuitry, or a combination or both. Embodiments of the system may further comprise the client node having means for forming a scale value as a function of the determined transmission rate of the received data stream and a reference data stream rate, such as via an additional or the same processor executing machine readable instructions, client-side computing circuitry, or a combination or both, and means for transmitting the formed scale value to the server node via, for an example, an output port for a wired or wireless network link or an integral wireless transmitter, wherein the transmission conforms to at least one routing protocol, and wherein the server node further includes means for receiving the transmitted formed scale value via, for an example, an input port for a wired or wireless network link or an integral wireless receiver. The client-side means for transmitting the formed scale value may include means for transmitting the formed scale value within an RTSP header such as via an additional or the same client-side processor executing machine readable instructions, client-side computing circuitry, or a combination or both. The client node may comprise means for forming a scale value as a function of the determined transmission rate of the received data stream, a reference data stream rate, and a member of a set of server-supported scale values, such as via an additional or the same client processor executing machine readable instructions, client-side computing circuitry, or a combination or both. System embodiments may include a client node that comprises means for forming a speed value as an inverse function of the formed scale value or means for forming a speed value as an inverse function of the formed scale value that was based on a member of a set of server-supported scale values, such as via an additional or the same client-side processor executing machine readable instructions, client-side computing circuitry, or a combination or both.

BRIEF DESCRIPTION OF THE DRAWINGS

The present invention is illustrated by way of example and not limitation in the figures of the accompanying drawings, and in which.

DETAILED DESCRIPTION

The methods, client computing apparatuses and client-server system embodiments of the present invention provide for client-controlled adaptive streaming. Exemplary embodiments of the present invention may be described where the exemplary server is a Real-Time Streaming Protocol (RTSP) server and supports RTSP "Scale" and/or RTSP "Speed" headers. An exemplary client-server system may be comprised of a server entity, or server node, in communication with a client entity, or client node, via a transmission link or network. The server entity is adapted to support a streaming protocol where either the scale or speed, or both, of the media being served may be changed by one or more communications from the client entity to the server entity. The server entity of the present example supports RTSP and provides RTSP server functionality. The exemplary server entity may support the RTSP Scale header and the RTSP Speed header or may only support the RTSP Speed header. The client entity, or client node, is adapted to support a streaming protocol where either the scale or speed, or both, of the media being served may be changed by one or more communications from the client entity to the server entity. The client entity of the present example supports RTSP and provides RTSP client functionality. Accordingly, the RTSP client supports the RTSP Scale header, the RTSP Speed header, or both.

Examples of Scale-Speed Client, Method and System

Figure 1:
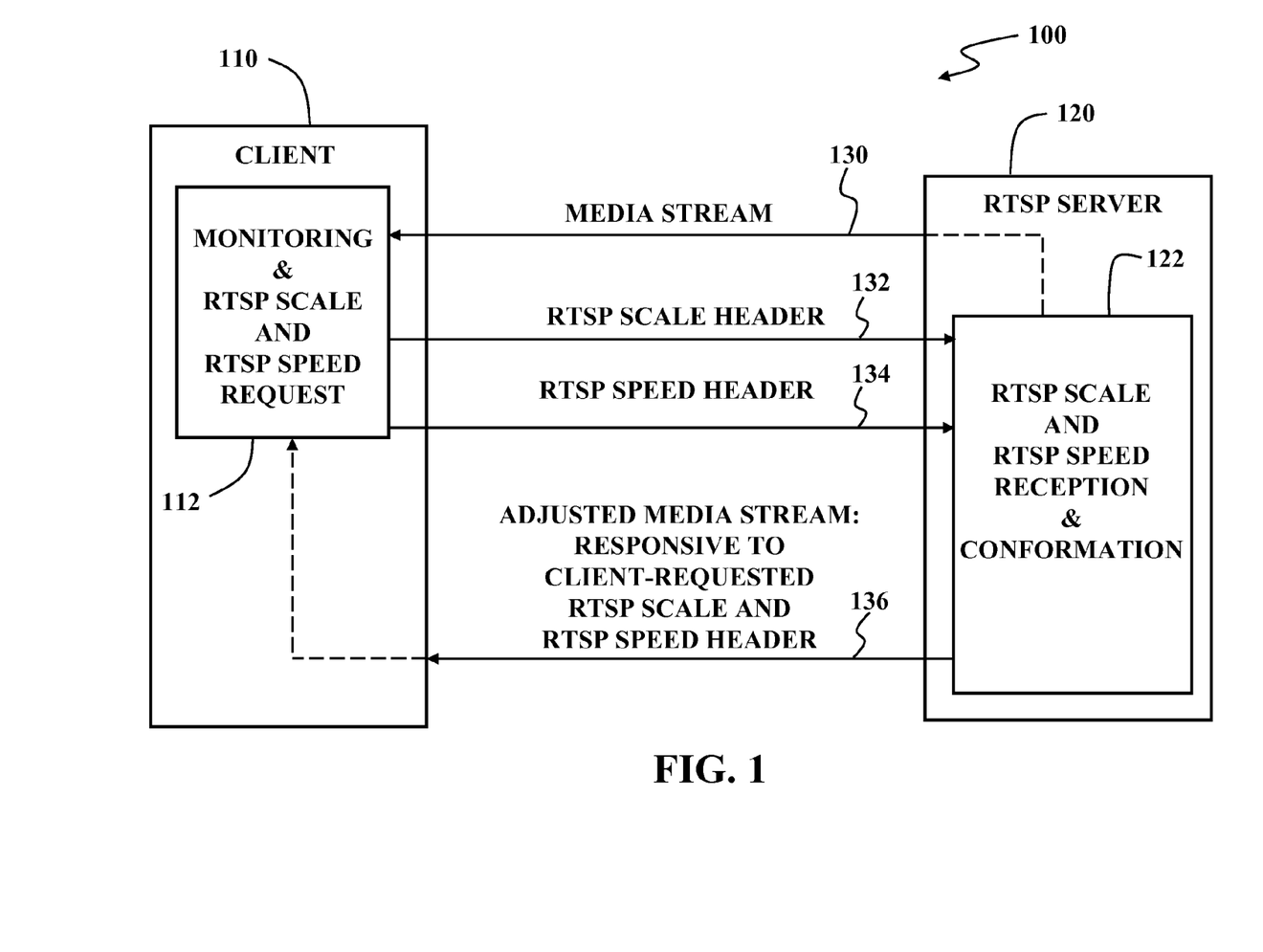
FIG. 1 is a functional block diagram showing a client-server embodiment of the present invention.

Referring to FIG. 1, illustrated is a functional block diagram example of a client-server model 100 for example, the client processing 112 at the client node 110 monitors its reception of the incoming media stream 130, and, based on properties of the received media stream, may make a decision to exploit the RTSP protocol in order to control the server 120 in a manner to effect adaptive streaming and playback. Continuing with the description of this exemplary embodiment, the client, when faced with network congestion/reduced bandwidth, may invoke an RTSP Scale header 132 and an RTSP Speed header 134 so as to cause the server processing 122 to drop parts, e.g. frames, of the media stream, thereby reduce the incoming stream rate 136. The client processing 112 can then play the received media stream at normal rate.

Figure 2:
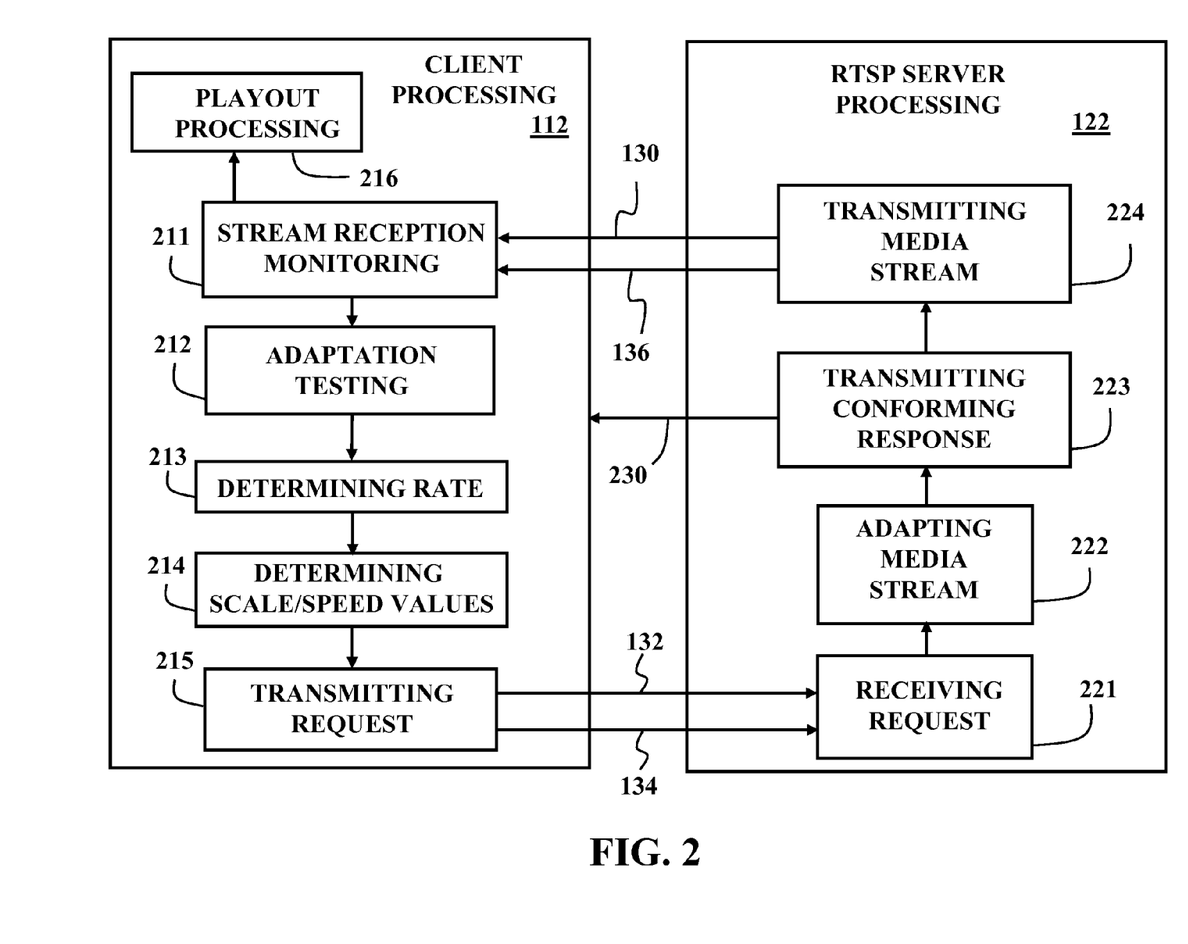
FIG. 2 is a functional process flow diagram of a client-server embodiment of the present invention.

The exemplary steps executed as machine readable instructions, computing circuitry or, a combination of both, by the client processing and the server when the server supports media scale and speed headers such as RTSP Scale and RTSP Speed headers may be explained with FIG. 2, which is a functional process flow diagram of a client-server embodiment, as follows: (a) stream reception monitoring 211; (b) adaptation testing or decision making 212; (c) rate determination 213; (d) determining values for header requests 214; (e) transmitting header requests 215; (f) the server processing receiving the header requests 221; (g) the server processing handling the header requests by adapting the media it is streaming 222 in order to conform to the header speed and/or scale value requests; (h) responding to client 223 to the extent the server has conformed 230; (i) transmitting the adapted media stream 224 to the client; and (g) the client receiving and playing the 216 stream.

Stream Reception Monitoring

Embodiments of the present invention have client-side monitoring of incoming stream reception. In general, the client may measure various statistics based on its packet reception. In some embodiments the client can measure: (a) the reception rate of the media stream (e.g. average number of bits received per second, or number of time-units of data received per second); and (b) the packet loss rate, e.g. number of packets lost per second as seen by the client, which can be measured based on packet sequence number when using the Real-Time Transport Protocol (RTP).

In an example embodiment, the client records a number of received bits of data from the media stream and does so over a definable period of time, or time segment or recoding time window. Let: T define a time segment; t define the current time; $b_k^R$ define the number of bits of data received at the client in the previous $k^{th}$ time segment, i.e., during the time $[t-kT, t-(k-1)T]$; and $P_k$ define the number of packets lost as seen by the client in the previous $k^{th}$ time segment.

Adaptation Decision Making

In several embodiments of the present invention, the client may make a determination or decision, executed as machine readable instructions, computing circuitry or, a combination of both, whether to employ client-controlled media stream adaptation. The client may have access to the native rate of the original or initial media stream being transmitted by the server, which is also termed the nominal stream rate (R). More particularly, if the stream reception rate drops below a threshold and/or if the packet loss rate increases above some threshold, the client may decide to employ adaptation. In some embodiments, the client tracks the past history of reception rate and packet loss rate for the media stream and may apply the current measured values of, for example, the last time segment, by comparing them to the past values before making the decision whether to invoke the adaptation.

Rate Determination

Figure 3:
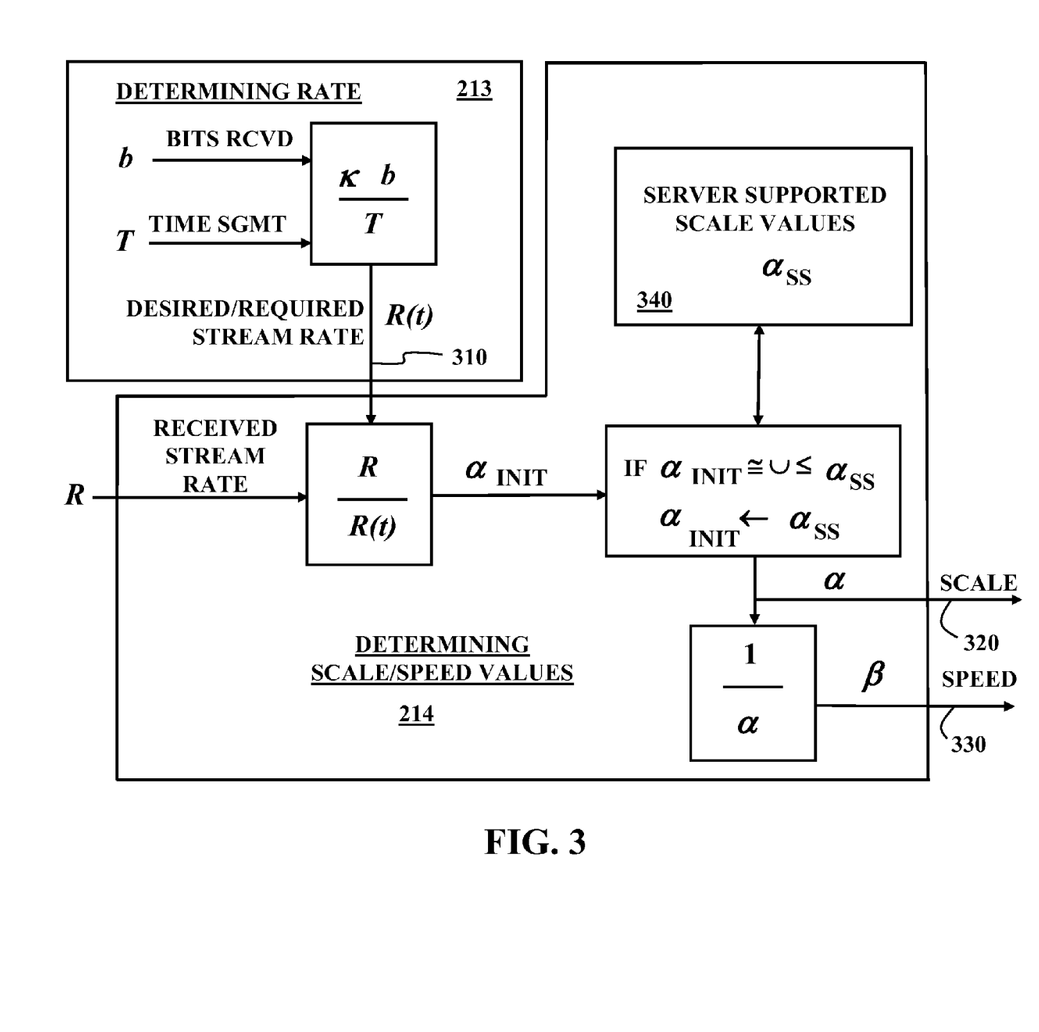
FIG. 3 is a functional block diagram showing a client-side scale and speed determinations of an embodiment of the present invention.

Once the decision to employ adaptation is taken, the client determines, via executed as machine readable instructions, computing circuitry or, a combination of both, the rate of media stream reception that may be processed in anticipation of communicating that value or a related value to the server. FIG. 3 is a functional block diagram illustrating that the client rate determination 213, executed as machine readable instructions, computing circuitry or, a combination of both, may be based on an estimate by the client processing of the current available bandwidth or throughput. The client rate determination 213 may also be based on additional factors such as: the client buffer size, current amount of data in the client buffer, current packet loss rate, and whether RTSP Scale and/or RTSP Speed factors are supported by the server providing the streaming media.

In an example embodiment, the client determines the desired, or required, rate, R(t) 310, at which it receives a constant bit rate (CBR) media stream as:

$$\min((R(t-T)+S), R) \quad \text{if } P_0 = 0, \quad \frac{b_0^R}{T} \geq R(t-T)$$

$$R(t) = \frac{\kappa * b_o^R}{T} \quad \text{otherwise} \quad S = \frac{(R-R(t))}{N}$$

With R(0)=R, where R is the default/original stream rate, N is a constant, and $0<\kappa \leq 1$.

Other embodiments may use other steps for rate determination, executed as machine readable instructions, computing circuitry or, a combination of both, such as those used to determine and stay within receiver capacity or network capacity as affected by network congestion. For example, some embodiments may determine a transmission rate based on considering the difference between the number of packets received between two reports, the fraction of packets lost by the receiver, and the time interval between the two reports.

Determining Values for Header Requests

FIG. 3 also illustrates in the functional block diagram that the client processing, executed as machine readable instructions, computing circuitry or, a combination of both, may determine desired factors of RTSP Scale 320 and RTSP Speed 330 based on the desired rate 310 at which it receives the media stream. In an exemplary embodiment, the client generates an RTSP Scale header having a scale value of α>1.0 and may generate an RTSP Speed header having a speed value β<1.0. When an RTSP scale value of α>1.0 is used, the normal play time (NPT) increases at α times the wall-clock rate, i.e., α times the real-time rate. If the RTSP Scale header was used alone by the client, then, if the client plays back the received media stream at normal rate, it will appear to play faster than real-time. In order to restore the nominal play back characteristic, in addition to the RTSP Scale header, the client will use an RTSP Speed header with β<1.0 in order to throttle the rate of stream transmission.

In one exemplary embodiment, the value β will be chosen equal to $\frac{1}{\alpha}$. This will then result in the normal play time (NPT) increasing at α times the wallclock rate in terms of the received media stream with a throttling of stream transmission rate in order to compensate for scale effect and produce an approximately nominal playback at the client. In other embodiments, the value of β can be close to but not exactly equal to $\frac{1}{\alpha}$. Thus, in some embodiments, the client may calculate the values of α and β as follows:

$$\alpha = \frac{R}{R(t)} \text{ and } \beta = \frac{1}{\alpha}.$$

For example, if R(t) is $$\frac{3}{5}R,$$

then the scale value of α is approximately 1.667 and the speed value of β is approximately 0.667.

In another embodiment, an initial value α (i.e., $\alpha_{initial}$) can be calculated by the client, executed as machine readable instructions, computing circuitry or, a combination of both, based on knowing, or having possession of, the nominal stream rate, and calculated/required stream rate as $$\alpha_{initial} = \frac{R}{R(t)}.$$

Then this $\alpha_{initial}$ may be refined based on which scale values are supported by the server. For example, the value of α can be refined to be equal to the server supported scale value 340 which is closest to and greater than or equal to the value of $\alpha_{initial}$. Standard mechanisms could be used by the client to learn about the server supported scale (and speed) values. For example, the Digital Living Network Alliance (DLNA) 1.5 guidelines allow for communicating these values to the client via ps-param of the 4th field "protocolInfo" and MM maxsp-param.

In some embodiments, the client may monitor the actual reception rate in response to the currently selected values of α and β to iteratively make adjustments by decreasing or increasing the value of β (and then α) to cause the received stream rate to approximate to the required stream rate R(t) or match the received stream rate closely with the required stream rate R(t).

Exemplary streaming media may comprise a "Group of Pictures" that begins with an "I" frame and that is followed by "P" frames and "B" frames where the I frame comprises intra-coded frames, the P frames comprise predicted frames based on prior I or P frames plus additional data for changed macroblocks. B frames comprise bidirectionally predicted frames on appearance and positions of past and future frames macroblocks. In some embodiments, a smart client can keep track of the typical size of I, P and B frames and past history of the server response to particular RTSP scale values to directly make a choice for values of α and β without requiring iterative adjustment.

Transmitting Header Requests

According to RFC 2326, when RTSP Scale header is used, the server may process, executed as machine readable instructions, computing circuitry or, a combination of both, media stream, e.g., drop frames, such that the data rate is substantially invariant. In order to attempt to effect a change on the server side in the media stream rate, the client may send an RTSP PLAY request to the server with the determined RTSP Scale header and determined RTSP Speed header. Accordingly, if the server supports RTSP PLAY request queuing, then the client could send the new RTSP scale and RTSP Speed headers by sending a new RTSP PLAY request directly. The client may include a Range header to indicate the time at which the Scale and Speed values are requested to be effective. In some embodiments, the client may use the (npt=now-) as the Range header. If the server does not support RTSP PLAY request queuing then the client may send a RTSP PAUSE request before sending the new RTSP PLAY request with the determined RTSP Scale and RTSP Speed headers.

Server Handling of the Request, Response

Once the server receives the RTSP PLAY request with RTSP Scale and RTSP Speed header from the client and presuming the server supports the clients request, the server, executed as machine readable instructions, computing circuitry or, a combination of both, conforms to the client request by adjusting its Scale and Speed based on a value of α and β respectively. In some embodiments, the server may entirely conform the actual Scale and Speed values to the client-requested values and may communicate the actual values it is using to the client in its response to the client. Upon receipt of actual Scale and Speed values being used by the server and not entirely conforming to the client's request, the client may decide, via executed machine readable instructions, computing circuitry or, a combination of both, to issue another RTSP request to the server containing adjusted Scale and Speed values. For example, if the client requested "Scale: 1.66, Speed: 0.6" and the server responds with "Scale: 2.0, Speed: 0.6," the client may send to the server another request with "Scale: 2.0, Speed: 0.5" and continue monitoring for a conforming response and media stream.

Client Side Stream Reception

Once the client receives the media stream at the client-requested Scale and Speed values, the client may play the received stream at normal rate. If the Scale header had a value greater than one, e.g., "Scale:2.0," the server is dropping some of the frames, and if the Speed header had a value less than one, e.g., "Speed:0.5," the stream will be received by the client at a correct rate for normal playout. If the client observes, via executed as machine readable instructions, computing circuitry or, a combination of both, that the received data timestamps are altered then the client may re-adjust the timestamps before playing out the media and may base the re-adjustment on the scale value.

Examples of Speed-Only Client, Method and System

Figure 4:
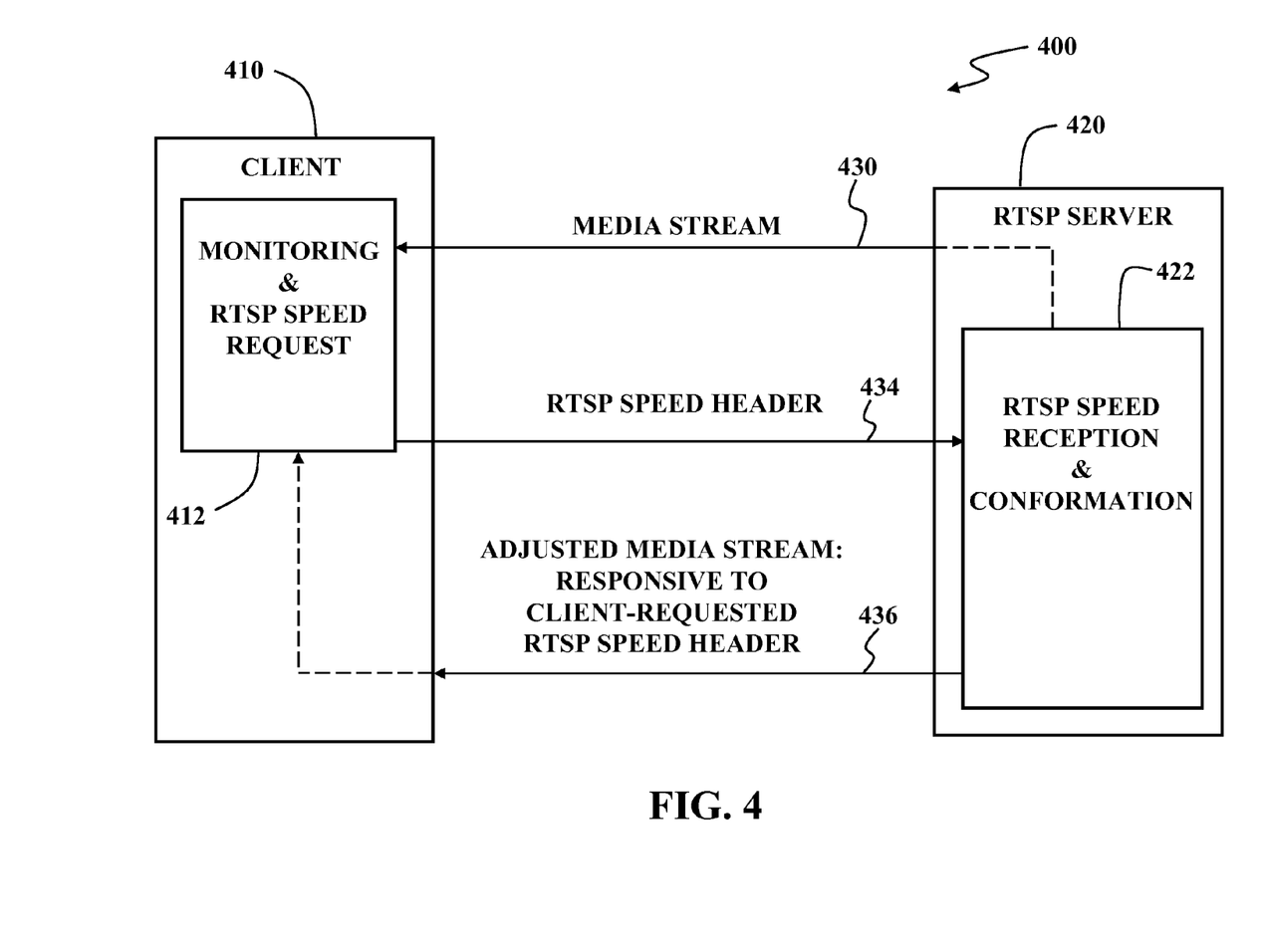
FIG. 4 is a functional block diagram showing another client-server embodiment of the present invention.

In another exemplary embodiment, the client, when faced with network congestion/reduced bandwidth, may invoke, via executed machine readable instructions, computing circuitry or, a combination of both, an RTSP speed header to change, e.g., reduce, the rate at which the media stream is transmitted by the server and thereby change the rate at which the media stream is received by the client. Referring to FIG. 4, illustrated is a functional block diagram example of a client-server model 400 example, the client processing 412 at the client node 410 monitors its reception of the incoming media stream 430, and, based on properties of the received media stream, may make a decision to exploit the RTSP protocol in order to control the server 420 in a manner to effect adaptive streaming and playback. Continuing the exemplary embodiment, the client, when faced with network congestion/reduced bandwidth, may invoke an RTSP Speed header 434 so as to cause the server processing 422 to reduce or increase the transmission of the media stream, and thereby reduce the incoming stream rate 436. In this exemplary embodiment, the client processing 412 may employ adaptive media playout to play the media at a nominal rate.

Decreased reception rate at the client and/or increased packet loss rate, may cause a client to invoke a media stream adaptation causing the server to reduce the stream transmission rate. In the event the server providing the media stream does not support client-generated changes in the scale value, embodiments of the present invention as shown in FIG. 4 provide for client-controlled media streaming adaptation via the speed value. Accordingly, whether or not a server such as an RTSP server supports a scale value such as that applied in the RTSP Scale header, the speed-only client, method and system embodiments may be applied where a server, such as an RTSP server, supports receiving, incorporating and conforming to a client-generated RTSP Speed header. An exemplary embodiment for exploitation of the RTSP Speed header only may include all of the steps of the scale-speed method described above except for those particularly pertaining to the RTSP Scale header feature and may have additional steps. Accordingly, the exemplary steps executed by the client and the server when the server supports a media speed header, such as an RTSP Speed header, of the embodiment illustrated in FIG. 4 may be illustrated in a functional process flow diagram in FIG. 5 as follows: (a) stream reception monitoring 511; (b) adaptation testing or decision making 512; (c) rate determination 513; (d) determining a value for header request 514; (e) transmitting header request 515; (f) the server processing receiving the header requests 521; (j) the server processing handling the header requests by adapting the media it is streaming 522 in order to conform to the header speed value request; (h) responding to client 523 to the extent the server has conformed 530; (i) transmitting the adapted media stream 524 to the client; and (g) the client receiving and playing the 516 stream by means of adaptive playout processing.

Determining Speed Value for Header Request

Figure 5:
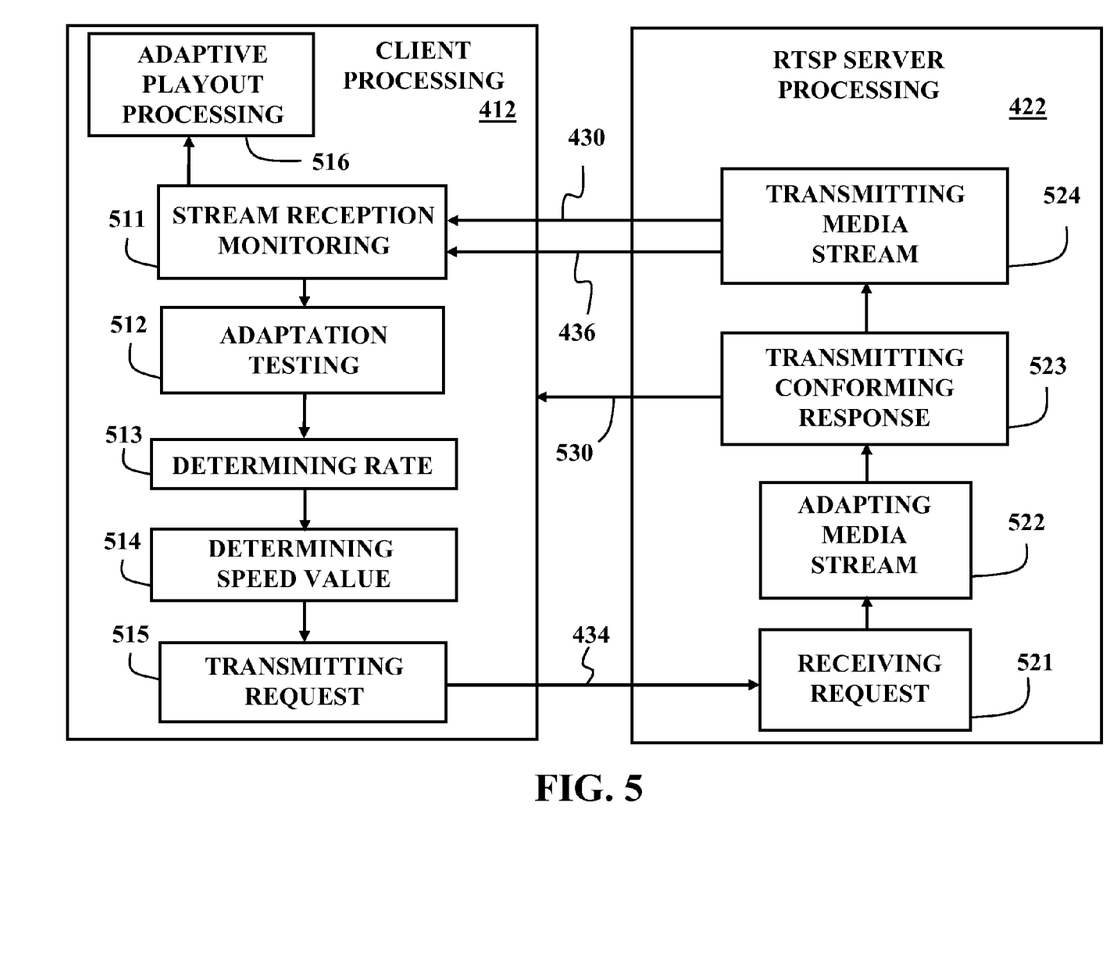
FIG. 5 is a functional process flow diagram of another client-server embodiment of the present invention.
Figure 6:
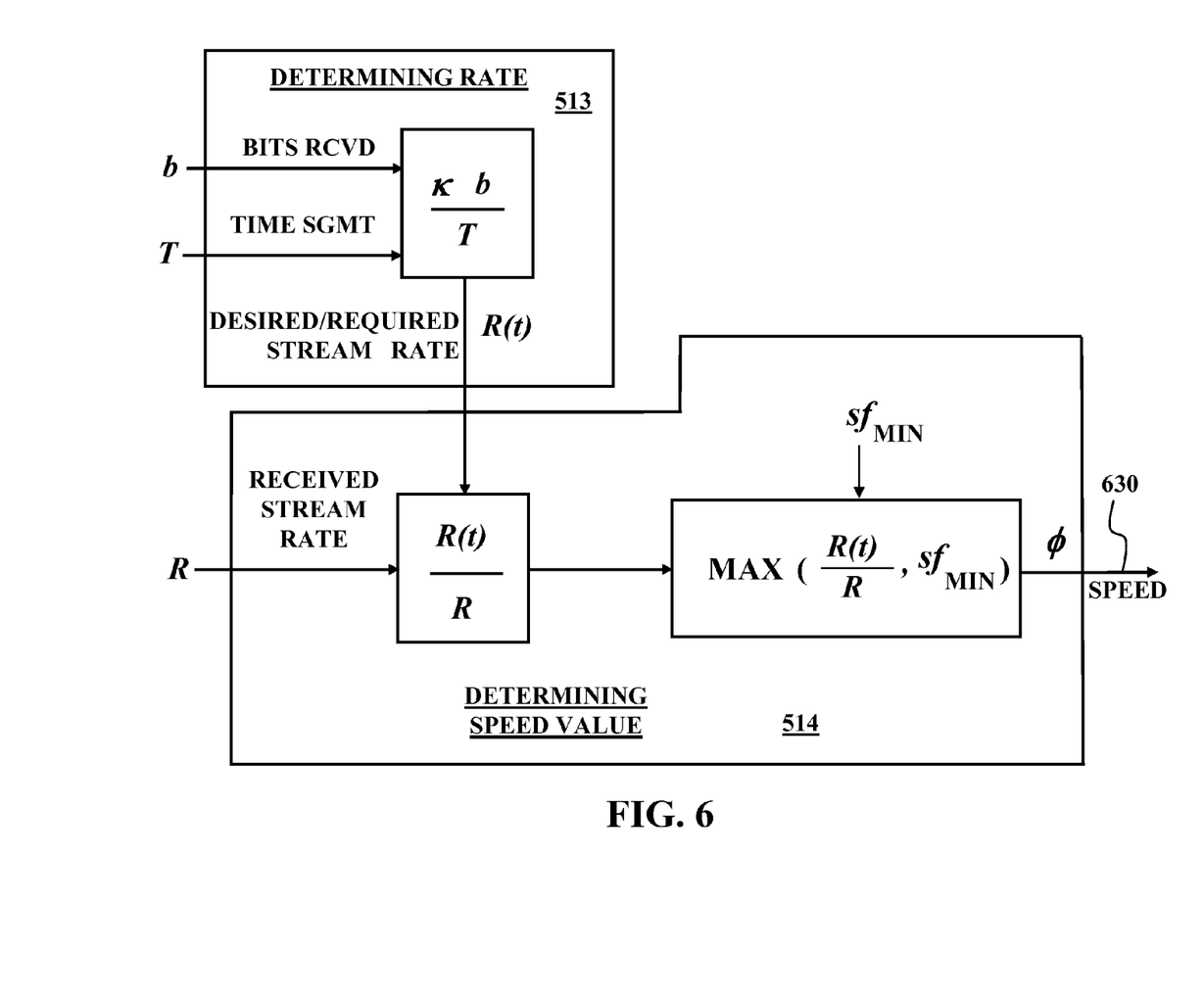
FIG. 6 is a functional block diagram showing a client-side speed determinations of another embodiment of the present invention.

The client may determine a desired RTSP Speed factor based on the determined rate at which it desires to receive the media stream as shown in FIG. 5 and by example in a functional block diagram of FIG. 6. In some embodiments of the present invention, the client may transmit a RTSP Speed header with a speed value $\varphi<1.0$ to throttle the rate of stream transmission from the server. The value of $\varphi$ may be determined 514 as follows:

$$\varphi = \frac{R(t)}{R}.$$

For example, if R(t) is $$\frac{3}{5}R,$$

then the speed value of $\varphi$ is approximately 0.667. The client may execute the steps of adaptive media playout where the media playout rate is adapted to the fullness of the client buffer. For example, the playout rate may be reduced relative to the normal rate, e.g., the video frame rate during the period when media stream is received at slower speed.

A minimum slowdown scale factor value, or minimum playout rate multiplier, $sf_{min}$ which is a value less than one, may be based, via executed machine readable instructions, computing circuitry or, a combination of both, on models as a priori models of user perception of an acceptably slow playout rate or may be based on the type of media content being played back and/or client adaptive playout capabilities. So, in some embodiments, the determination of $\varphi$ by the client may be influenced by the incorporation of the minimum slowdown scale factor value, $sf_{min}$, at which the client is capable of performing the playout. Accordingly, $\varphi$ may be determined as follows:

$$\varphi = \max\left(\frac{R(t)}{R}, sf_{min}\right).$$

For example, if R(t) is $$\frac{3}{5}R$$

and $sf_{min}$ is 0.8, then the speed value of $\varphi$ is 0.8. Accordingly, the resulting speed value may be transmitted as a requested RTSP Speed 630.

Client Side Stream Reception

As the client receives the media stream at the requested speed, the client may employ via executed as machine readable instructions, computing circuitry or, a combination of both, an adaptive media playout process to play out the stream, i.e., where the media playout rate is adapted to the fullness of the client buffer. In some embodiments, the selected slow-down scale factor for adaptive media playout will be equal to $\varphi$. In other embodiments, the client may employ, via executed machine readable instructions, computing circuitry or, a combination of both, an adaptive media playout process based on the current buffer level as the data is received from the server at the requested slower speed. Should the client detect an increase in available bandwidth via executed machine readable instructions, computing circuitry or, a combination of both, the client may desire, i.e., be programmed to prefer, to preserve the total stream playback duration and accordingly may employ a faster speed playback to compensate for the past slow speed playback.

Exemplary Implementation

An exemplary embodiment of the speed-only method and system was implemented with a standard RTSP server for the server side. A custom RTSP client was developed in Perl using the Perl RTSP module. A 720×576 video stream was used for the tests via an IEEE 802.11g wireless network. The test scenario consisted of the client desiring to play back the first, approximately, 60 seconds of a video stream. During the first 20 seconds of video streaming, the available bandwidth on the network link is sufficient for the stream rate. After the first 20 seconds of video streaming, the bandwidth drops to below stream rate. In the scenarios considered, the average bandwidth drops to 80% of the stream rate. The bandwidth remains below stream rate from the first 20 to 45 seconds. After the first 45 seconds the bandwidth comes back and becomes sufficient for the stream rate. In this scenario, our proposed method, receives stream at normal stream rate for the first 20 seconds and consumes the stream at normal rate. Between the first 20 to 45 seconds, the proposed method uses RTSP client capability to control the rate of the stream transmission from the server to a value lower than the nominal stream rate. In addition it employs adaptive media playout during this time to keep buffer occupancy at the correct level and to prevent buffer underflow/starvation. From 45 seconds onwards the client again uses its RTSP client functionality to control the server to change the stream transmission rate back to the normal stream rate and plays back the stream at normal rate.

Figure 7:
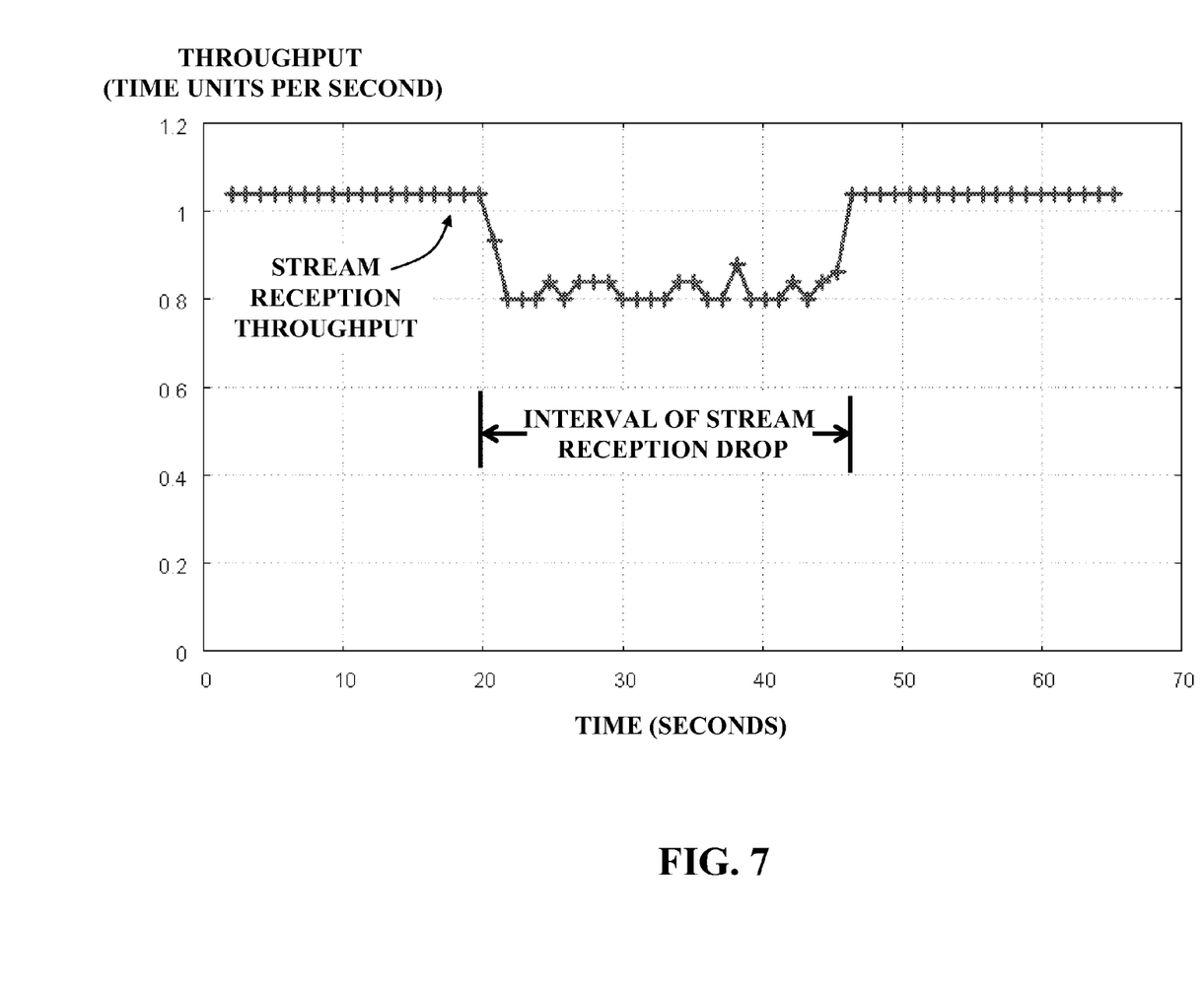
FIG. 7 is a graph illustrating an exemplary media stream reception throughput as seen by the client.

FIG. 7 shows the stream reception throughput trace captured at the client. The throughput is shown in time-units (seconds) per second. As can be seen in FIG. 7, the stream reception throughput drops lower than the stream rate during the time interval from 20 to 45 seconds.

Figure 8:
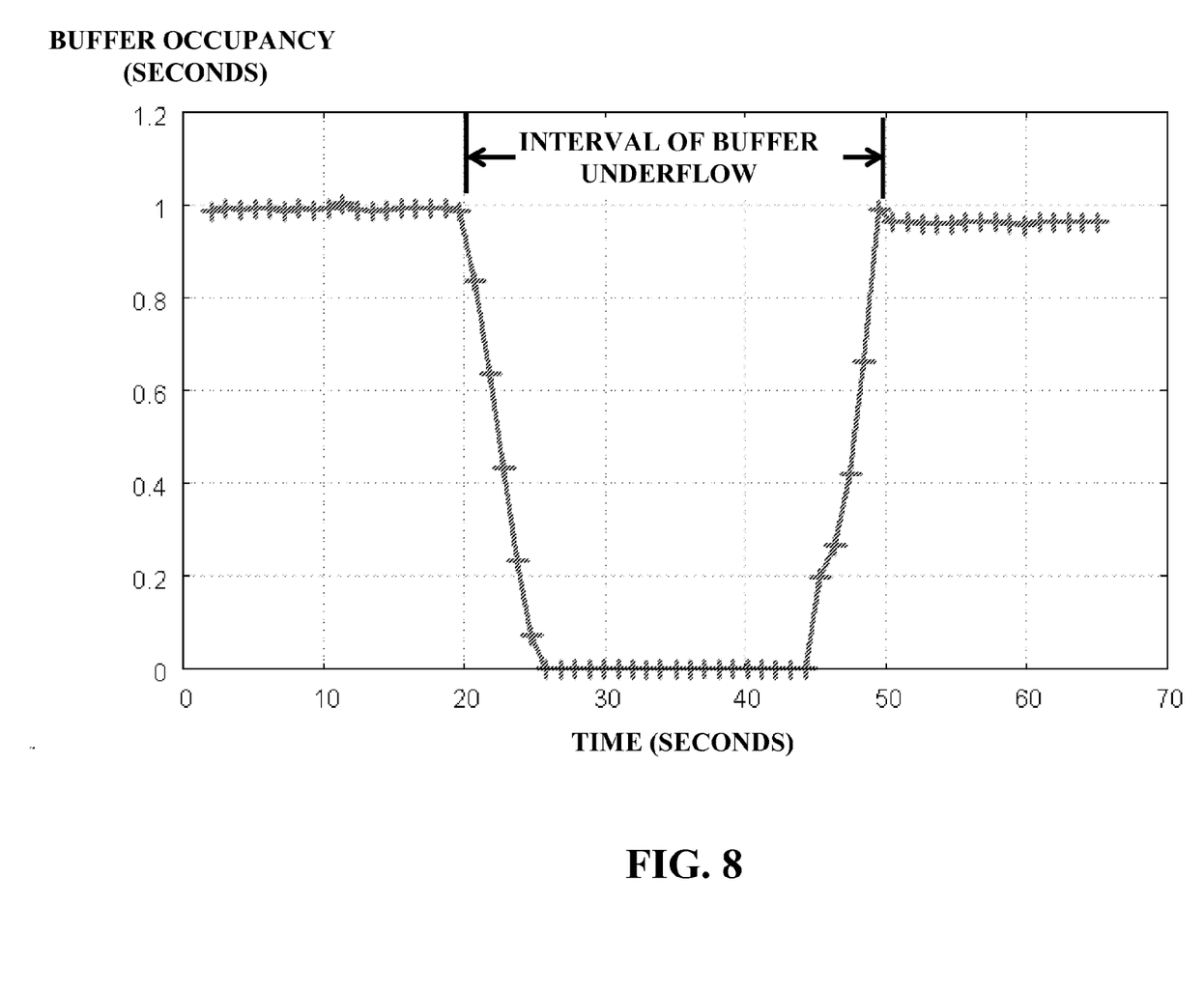
FIG. 8 is a graph illustrating exemplary buffer occupancy at the client when the client is not executing an exemplary RTSP Speed-only process embodiment of the present invention and not executing adaptive media playout processing.
Figure 9:
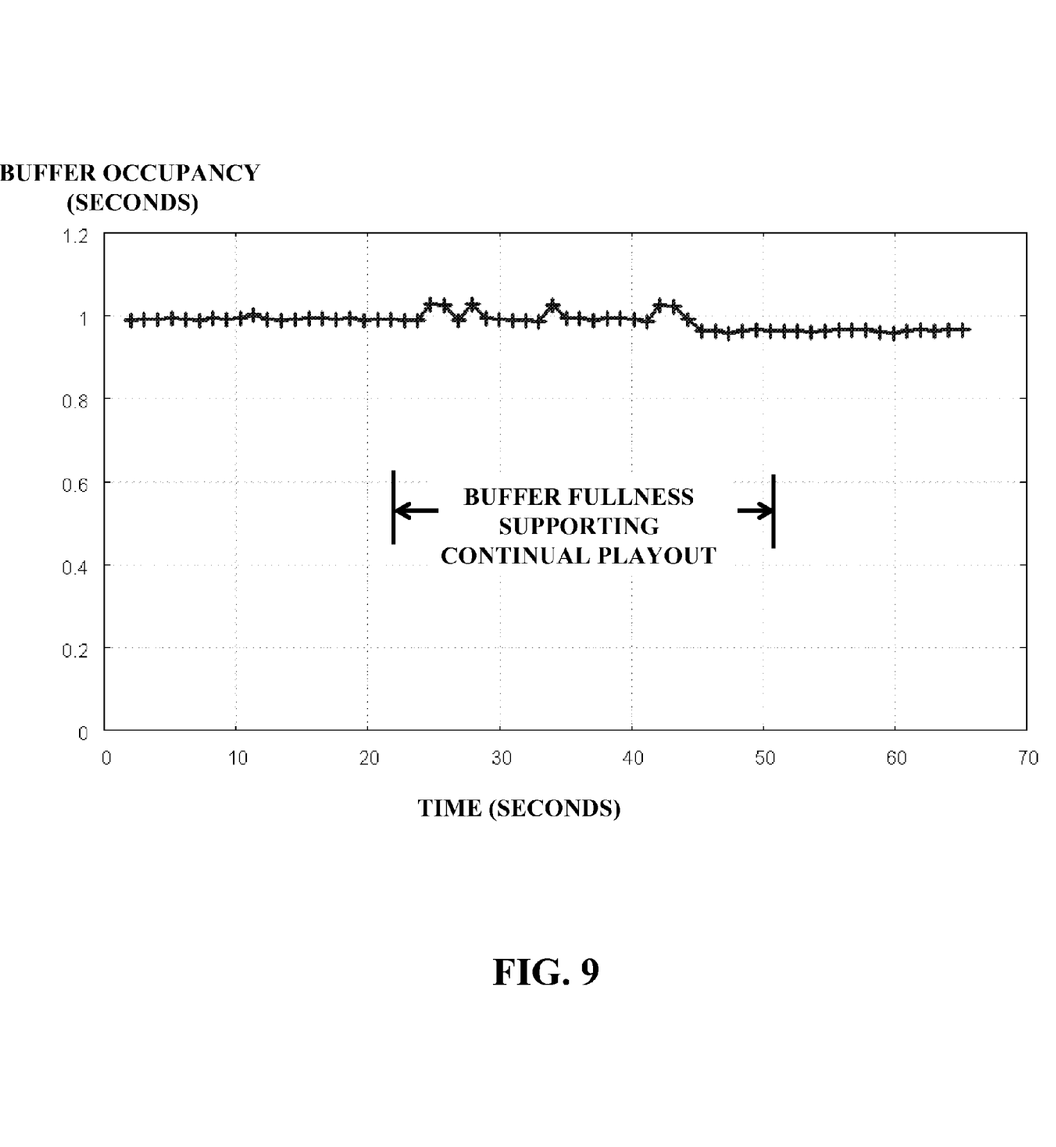
FIG. 9 is a graph illustrating exemplary buffer occupancy at the client when the client is executing an exemplary RTSP Speed-only process embodiment of the present invention along with adaptive media playout processing.

FIG. 8 shows the buffer occupancy at the client during the streaming session when the client is not using any adaptive technique. FIG. 9 shows the buffer occupancy at the client during the streaming session when the client is using adaptive media playout and the client-controlled adaptation via the speed-only header. As can be seen in FIG. 8, not using the adaptive media playout and proposed RTSP Speed method will result in buffer underflow as the stream is not received at normal rate during the period of bandwidth scarcity. FIG. 9 shows that using adaptive media playout with the steps of the RTSP Speed method embodiment described above, results in buffer fullness supporting the stream being played out continually or nearly continuously without underflow.

The adaptive streaming methods and systems described herein may be applied in scenarios where the server is not conducting dynamic rate adaptation based on the current network and/or client conditions. This absence of dynamic rate adaptation may be because the server is not capable of doing such dynamic rate adaptation. In some instances, the reason for the server not supporting dynamic rate adaptation may be that the client may not be sending any feedback to the server (e.g. due to lack of a back channel or due to other system design limitations) or the server does not recognize the feedback being sent, and in either instance it is difficult for the server to infer or otherwise determine the current client and/or network conditions. In other instances, the server may not be capable of receiving and/or understanding the client feedback. The exemplary clients, methods, and systems may also be applied in instances where the server is not conducting dynamic rate adaptation and the transmitted stream contents are encrypted.

One of ordinary skill in the art will also appreciate that the modules and functions described herein may be further subdivided, combined, and/or varied and yet still be in the spirit of the embodiments of the invention. In addition, while a number of variations of the invention have been shown and described in detail, other modifications, which are within the scope of this invention, will be readily apparent to those of ordinary skill in the art based upon this disclosure, e.g., the exemplary flowcharts or processes described herein may be modified and varied and yet still be in the spirit of the invention. It is also contemplated that various combinations or subcombinations of the specific features and aspects of the embodiments may be made and still fall within the scope of the invention. Accordingly, it should be understood that various features and aspects of the disclosed embodiments can be combined with or substituted for one another in order to form varying modes of the disclosed invention. Thus, it is intended that the scope of the present invention herein disclosed should not be limited by the particular disclosed embodiments described above.

What is claimed is:

1. A computer-implemented method of adapting a data stream comprising:
    determining a transmission rate of a data stream received from a server, wherein the data stream comprises at least one of: a plurality of packets and a plurality of bits;
    forming, via client processing, a scale value as a function of the determined transmission rate of the received data stream, a reference data stream rate, and a member of a set of server-supported scale values; wherein the scale value is selected from the set of server-supported scale values based on the set of server-supported scale values and the quotient of the determined transmission rate of the received data stream and the reference data stream rate; and
    forming, via client processing, a speed value based on the formed scale value, wherein the formed speed value is based on a multiplicative reciprocal of the formed scale value and is a slower rate compared to the determined transmission rate of the received data stream.

2. The method of claim 1 further comprising, following the step of forming the speed value, inserting the formed scale value into a Real-Time Streaming Protocol (RTSP) header wherein the formed scale value is transmittable to the server within the RTSP header.

3. The method of claim 1 further comprising, following the step of forming the speed value, inserting the formed scale value into a Real-Time Streaming Protocol (RTSP) header wherein the formed scale value is transmittable to the server within the RTSP header; and
    wherein the scale value is further a function of a member of a set of server-supported scale values.

4. The method of claim 1 further comprising, following the step of forming the speed value, inserting the formed speed value and the formed scale value into a Real-Time Streaming Protocol (RTSP) header wherein the formed speed value and the formed scale value are transmittable to the server within the RTSP header.

5. The method of claim 1 further comprising, following the step of forming the speed value, inserting the formed scale value into a Real-Time Streaming Protocol (RTSP) header wherein the formed scale value is transmittable to the server within the RTSP header; and
    wherein the scale value is further a function of a member of a set of server-supported scale values, and wherein the formed speed value is a slower rate compared to a nominal stream rate and is based on a multiplicative reciprocal of the formed scale value.

6. A computer comprising:
    a processor and memory;
    means for determining a transmission rate of a received data stream received from a server, wherein the data stream comprises at least one of: a plurality of packets and a plurality of bits;
    means for forming a scale value as a function of the determined transmission rate of the received data stream, the reference data stream rate, and a member of a set of server-supported scale values; wherein the scale value is selected from the set of server-supported scale values based on the set of server-supported scale values and the quotient of the determined transmission rate of the received data stream and the reference data stream rate; and
    means for forming a speed value based on the formed scale value, wherein the formed speed value is based on a multiplicative reciprocal of the formed scale value and is a slower rate compared to the determined transmission rate of the received data stream.

7. The computer of claim 6 further comprising means for transmitting the formed scale value to the server originating the received data stream.

8. The computer of claim 6 further comprising means for transmitting the formed scale value to the server; and
wherein the means for forming a scale value is further a function of a member of a set of server-supported scale values.

9. The computer of claim 6 wherein the speed value is a slower rate compared to a nominal stream rate and is based on a multiplicative reciprocal of the formed scale value, the computer further comprising means for transmitting the formed scale value to the server.

10. The computer of claim 6 wherein the means for forming a scale value is further a function of a member of a set of server-supported scale values, and wherein the speed value is a slower rate compared to a nominal stream rate and is based on a multiplicative reciprocal of the formed scale value, the computer further comprising means for transmitting the formed scale value to the server.

11. A system comprising:
a client node comprising:
    a processor and a memory store;
    means for determining a transmission rate of a received data stream received from a server, wherein the data stream comprises at least one of: a plurality of packets and a plurality of bits;
    means for forming a scale value as a function of the determined transmission rate of the received data stream, a reference data stream rate, and a member of a set of server-supported scale values; wherein the scale value is selected from the set of server-supported scale values based on the set of server-supported scale values and the quotient of the determined transmission rate of the received data stream and the reference data stream rate; and
    means for forming a speed value based on the formed scale value, wherein the formed speed value is based on a multiplicative reciprocal of the formed scale value and is a slower rate compared to the determined transmission rate of the received data stream; and
the server node comprising:
    a processor and a memory store; and
    means for receiving the formed speed value.

12. The system of claim 11 wherein the server node further comprises means for adapting the transmission rate of the data stream received by the client node.

13. The system of claim 11 wherein the client node further comprises means for transmitting the formed scale value to the server node and wherein the server node further comprises means for receiving the transmitted formed scale value.

14. The system of claim 11 wherein the client node further comprises means for forming a scale value wherein the scale value is further a function of a member of a set of server-supported scale values, and means for transmitting the formed scale value to the server node and wherein the server node further comprises means for receiving the transmitted formed scale value.

15. The system of claim 11 further comprising means for transmitting the formed scale value to the server node; and wherein the client node further comprises means for forming a scale value wherein the speed value is a slower rate compared to a nominal stream rate and is based on a multiplicative reciprocal of the formed scale value; and wherein the server node further comprises means for receiving the transmitted formed scale value.

16. The system of claim 11 wherein the server node further comprises means for receiving the transmitted formed scale value; and
wherein the client node further comprises means for forming a scale value based on a member of a set of server-supported scale values, wherein the speed value is as a slower rate compared to a nominal stream rate and is based on a multiplicative reciprocal of the formed scale value and means for transmitting the formed scale value to the server node.

* * * * *